United States Patent Office 3,477,926
Patented Nov. 11, 1969

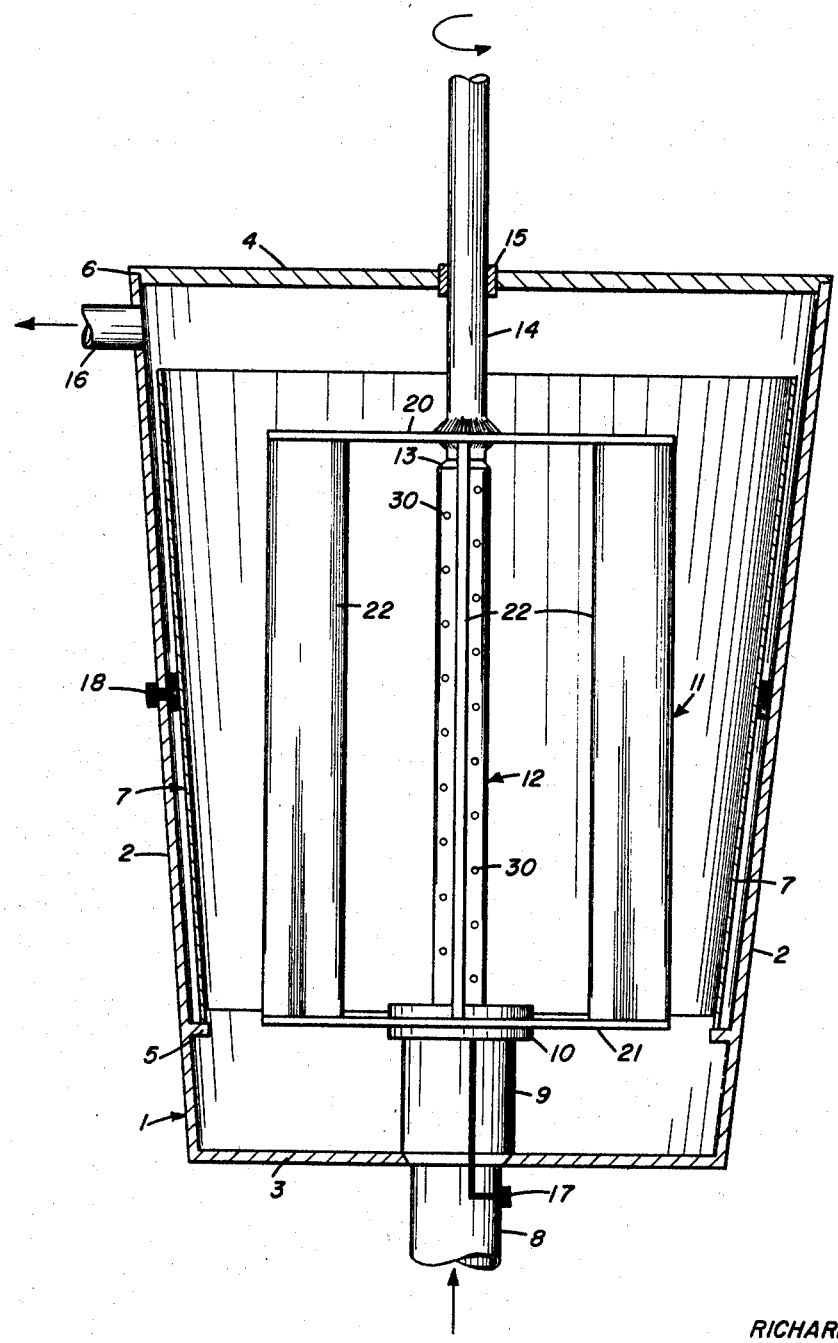

3,477,926
ELECTROLYTIC PROCESS AND APPARATUS FOR RECOVERING METALS
Richard W. Snow and Chester C. Wilt, Rochester, N.Y., assignors to Eastman Kodak Company, Rochester, N.Y., a corporation of New Jersey
Filed May 24, 1965, Ser. No. 458,124
Int. Cl. C22d 1/12; B01k 3/04
U.S. Cl. 204—109    12 Claims

ABSTRACT OF THE DISCLOSURE

Apparatus for electrolytic recovery of silver incorporating a tubular cathode surrounding a tubular anode with an agitator disposed therebetween for rotation about the anode. The silver-containing solution may be introduced through the tubular anode.

---

This invention relates to a new electrolytic process and apparatus. More particularly it relates to a new electrolytic process and apparatus for recovering silver from exhausted photographic processing solutions.

Thousands of feet of light sensitive materials are utilized daily in recording current events, reproducing documents, medical diagnoses, industrial production controls, and in scientific research. As a result, large quantities of developing and fixing solutions are required to process the exposed light sensitive materials. These solutions become exhausted after a period of use and must be replaced with fresh solutions. The exhausted solutions contain dissolved silver compounds from which free silver may be recovered by an electrolytic process. The desirability of recovering this free silver is obvious when considering the vast quantities of exhausted processing solutions available and the value of the free silver.

The electrolytic process for recovering this silver generally involves the reduction of free silver ions to metallic silver which becomes plated on a cathode. The free silver ions are yielded by the dissociation of silver thiosulfate complex ions which are present in the exhausted processing solutions.

These reactions are illustrated by the following equations:

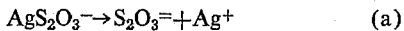  (a)

  (b)

At the same time thiosulfate and tetrathionate ions present will be competing for electrons at the same cathode:

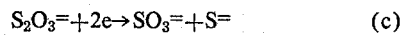  (c)

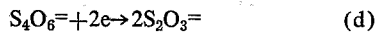  (d)

Two things are immediately obvious: (1) Since the silver ion is tied up in the negatively charged thiosulfate which will migrate away from the cathode, the concentration of silver ions at the cathode surface can be very low; (2) if reaction (c) occurs to any degree, the sulfide ion formed would immediately precipitate the silver as silver sulfide:

  (e)

The latter condition is a result of silver ion being removed from solution at the surface of the cathode at a rate considerably faster than it is being supplied by the ionization of the negatively charged silver thiosulfate ion at the cathode surface and the diffusion of undissociated silver thiosulfate ions toward the cathode surface. Consequently the much more abundant thiosulfate ion present at the cathode is reduced to sulfide ion which precipitates silver sulfide in the solution, poisons the plate (forms a black silver sulfide coating on the cathode) and liberates hydrogen sulfide. The presence of the sulfide ion in the photographic solution renders it unfit for further use.

The answer to the problem is to prevent the local drop in silver-ion concentration by agitation, but considerable agitation of the bulk of the solution is required to maintain the silver-ion concentration at the surface of the cathode. This is particularly true if the process is operated to plate silver at a very high rate.

The present invention solves the agitation problem by providing a unique distribution and agitation system which has not been heretofore known.

Therefore it is a primary object of this invention to provide a new process and apparatus to recover metallic silver from exhausted photographic processing solutions.

Another object of this invention is to provide a new process and apparatus for electrolytically recovering metallic silver on a batch or continuous basis.

Another object of this invention is to provide an apparatus for electrolytically recovering metallic silver which has a minimum of parts having a novel arrangement and simplicity of operation.

Another object of this invention is to provide a means for agitating the solution near both the cathode and anode which means also causes the solution to recirculate into and out of the apparatus.

A further object of this invention is to provide a novel anode for use in an electrolytic recovery apparatus which aids in dispersing the solution being processed.

A still further object of this invention is to provide a new process and apparatus for recovering metallic silver from exhausted photographic processing solutions wherein the recovered silver is at least 90% pure.

These objects, together with other objects and advantages, which will subsequently become apparent, reside in the details of construction and operation as more fully described and claimed hereinafter, reference being had to the accompanying drawing forming a part hereof, wherein like numerals refer to like parts throughout, and in which:

The illustration is a vertical sectional view wherein the tank and the cathode sheet are in section so as to illustrate the specific details of the agitator and the anode.

Referring now to the drawing in detail, there is illustrated a vertical tank 1 having sidewalls 2 and a bottom plate 3 integral therewith. A removable top cover plate 4 provides the uppermost portion of tank 1. This top cover plate may be secured in position by such mechanical means as bolts or clamps or it may merely rest in place with the aid of machined mating surfaces corresponding to sidewalls 2 of tank 1 as shown at 6 in the drawing.

Tank 1 may be cylindrical or irregular (box-like) in shape. Preferably it is of a shape corresponding to the frustrum of a cone with the smallest diameter at the bottom. The taper may be only slight but is desirable as it facilitates the insertion and removal of cathode plate 7 through the top of tank 1 as will be more fully described hereinafter.

The material of which tank 1 is constructed is electrically non-conductive at least to the extent of the interior portions. Particularly useful materials would be glass, plastic, and wood. On the other hand, tank 1 could be fabricated from an electrically conductive material, such as steel, provided it is internally coated with an electrically non-conductive material such as glass or plastic. The electrical non-conductive characteristic is essential to prevent the tank 1 from interfering with the electrolytic process.

Tank 1 is provided with an inlet pipe 8 through the bottom plate 3, which pipe is generally aligned with the axis of the tank. Connected to inlet pipe 8 and bottom plate 3 is a non-conducting support 9 which has a central passage communicating with the passage of inlet pipe 8. At the upper end of support 9 is secured a guide bearing 10 around which the lower portion of agitator 11 rotates. Anode pipe 12 is fixedly mounted at the top of support 9 with its central passage providing a continuation of the passages of support 9 and inlet pipe 8. The upper end of anode pipe 12 is press fitted with a plastic thrust bearing 13 which has been machined to an external cone. The plastic material for the bearing may be of a suitable polymer such as nylon or Teflon. A rotatable shaft 14 having an internal cone machined in one end is mated with thrust bearing 13 of anode pipe 12. The upper end of the rotatable shaft 14 extends through the removable top cover plate 4 provided with seal 15. Near the lower end of the rotatable shaft 14, which extends into tank 1, is mounted the upper portion of the agitator 11 in a fixed manner. The agitator 11, which is electrically non-conductive, extend axially downward into tank 1 in such a manner as to surround anode pipe 12. As pointed out before, the lower portion of the agitator 11 rotatably surrounds guide bearing 10 carried by support 9. A cathode sheet 7 concentrically surrounds both the anode pipe 12 and the agitator 11 and is positioned closely adjacent the sidewalls 2 of tank 1. The cathode sheet is supported at its lower end by a flange 5 protruding from the inner surface of sidewalls 2. The cathode sheet is preferably supported above the base of the tank 1 to avoid contact with any sludge which may build up in the apparatus. Flange 5 may extend continuously around the sidewalls 2 or it may be of an intermittent character. Near the top of tank 1 and above the uppermost portion of cathode sheet 7, an outlet pipe 16 is located in sidewalls 2.

Anode pipe 12 and cathode sheet 7 are provided with electrical contacts 17 and 18, respectively. The location of these contacts is not critical and may be positioned in any convenient manner in the apparatus.

The agitator 11 comprises an upper circular plate 20 which is fixedly secured to rotatable shaft 14 and lower circular plate 21 which rotates about guide bearing 10. Between the upper and lower circular plates 20 and 21 are paddle blades 22 which are fixedly secured thereto. Three paddle blades are shown but any number desired may be used as long as adequate agitation is provided. The precise dimensions of the paddle blades is also not critical provided there is adequate agitation.

Rather than using paddle blades as illustrated in the drawing a series of circular discs each carrying a number of vanes might be used. These of course would be arranged along the vertical axis of the tank 1 and would be maintained in position by a series of supports extending between circular plates 20 and 21. Other obvious mechanical designs may be used with equal effectiveness.

The agitator may be provided with an upper circular plate which is of larger dimensions than plate 20 shown in the drawing. This provision has the effect of constraining the solution against assuming the shape of a paraboloid of revolution upon being agitated. The increased dimension should be such that it is larger than the dimension across the paraboloidal surface of the liquid at the line of contact made by the upper circular plate and the surface of the liquid.

An additional benefit of using an upper circular plate of increased dimension is that a decrease in pressure occurs beneath the plate. This results in a pumping action of the agitator thereby eliminating the necessity for an external pump once operation is begun.

In either design the agitator 11 is non-conducting. For this reason it is preferable to fabricate the agitator from a plastic, wood, or glass. A metal may be used provided it is coated with a material to provide a non-conductive surface.

The anode pipe 12 comprises a pipe which has its central passage communicating with the inlet pipe 8. It may be fixedly secured to support 9 by any conventional means, e.g. a threaded connection. The support 9 is, of course, non-conductive. The opposite end of anode pipe 12 has a plastic thrust bearing 13 press fitted therein, thereby closing the central passage. The wall of the anode pipe 12 has a series of openings 30 drilled therethrough in random spaced relationship. In this manner the inlet pipe 8 has access to the interior of tank 1 via the central passage of anode pipe 12.

Alternatively, the openings in the wall of the anode pipe 12 may be dispensed with and distribution passageways may be formed in the thrust bearing 13 which communicate between the central passage of the anode pipe and the interior of the tank.

The anode pipe 12 is preferably fabricated by coating a titanium pipe with platinum although other satisfactory metals may be used as well. Graphite may also be used.

The cathode sheet 7 comprises a thin stainless steel sheet which is fabricated in such a manner that it may easily be spread into a substantially flattened condition upon being removed from the electrolytic apparatus and rolled into a cylindrical configuration for re-insertion into the apparatus. For example, the sheet may be formed to fit within the tank 1 while having an open longitudinal seam which is held together by some releasable mechanical means such as snaps or clips. It is obvious from this description of the cathode sheet that the taper of the tank 1, discussed previously, facilitates its insertion and removal.

As shown in the drawing the cathode sheet 7 rests on flanges 5 of the sidewalls 2 thereby preventing it from coming into contact with any sludge in the base of tank 1.

The electrical connection 18 for the cathode sheet is illustrated as a conductive fitting on sidewalls 2 with which the cathode sheet freely slides into contact upon being inserted into tank 1.

The electrical connection 17 for anode pipe 12 is illustrated as a lead-in wire passing into the tank by way of the inlet pipe 8 and support 9. This wire is attached to the anode pipe by passing through the guide bearing 10.

The just described electrical connections are merely by way of specific example as there are many equally effective and desirable ways of accomplishing the same objective as is apparent.

The operation of the above described apparatus will be discussed on the basis of a continuous process although it is to be understood that the apparatus may also operate as a batch process.

Exhausted photographic processing solutions are continuously pumped by any suitable means into tank 1 by way of inlet pipe 8 and through anode pipe 12. The exhausted solution is effectively distributed within tank 1 by a series of openings 30 in the wall of the anode or by distribution passageways in thrust bearing 13.

When the exhausted solution has reached a level slightly below outlet pipe 16 rotation of the agitator 11 is begun by means of a suitable power source connected to shaft 14. The desired plating current is then supplied to anode pipe 12 and cathode sheet 7 and silver begins to plate out on the cathode sheet.

The exhausted photographic processing solution is continuously pumped into the interior of tank 1 and continuously exits by way of exit pipe 16.

The novel inlet means of the present invention allows uniform distribution of the incoming solution. It also aids, in combination with the agitator, the circulation of the solution, particularly near the anode thereby preventing deposits of sulfur and sulfates which would shorten the life of the anode.

The process thus described allows higher plating currents to be used and thus more silver may be plated out per unit time than has been before possible without the danger of "sulfiding" of the exhausted solution and poisoning of the plate.

After a sufficient quantity of silver has been plated out the plating current is turned off and the pump and agitator are both stopped. The top cover plate 4 is removed and the cathode sheet 7 plated with silver is withdrawn. The releasable mechanical means holding the seam of the cathode sheet together are disengaged and the sheet is flattened out whereupon the silver plate is scraped off with any conventional scraping means.

Upon removal of the silver plate, the cathode sheet is reassembled and placed back in the apparatus. With the top cover plate 4 back in position the apparatus is again ready for operation.

Thus having described the present invention it is emphasized that the specific details set forth are not to be limiting. Any of the numerous modifications which may be effected therein without departing from the spirit and scope of the present invention are to be included.

We claim:

1. Apparatus for recovering metal from a metal-ion-containing liquid comprising a container for receiving such liquid, electrode means including a cathode and an anode disposed within the container for applying an electrical potential to said liquid, said anode being elongated and hollow, said cathode being disposed around said anode substantially concentric therewith, and means arranged to introduce said liquid into the container through said hollow anode thereby providing agitation of said liquid around said anode.

2. The invention according to claim 1 wherein said cathode is a cylindrical plate member surrounding said anode.

3. The invention according to claim 1 wherein a plurality of openings are provided in the anode to communicate the hollow portion of said anode with the interior of said container.

4. The invention according to claim 3 wherein said openings are disposed about the periphery and the length of said anode.

5. The invention according to claim 1 wherein an agitator is arranged between said anode and said cathode to provide further agitation of said liquid.

6. The invention according to claim 5 wherein said agitator is rotatably supported by said anode and is arranged to rotate about said anode.

7. The invention according to claim 6 wherein said agitator is supported by a bearing means at each end of said anode, and openings are provided through said bearing means to communicate the hollow portion of said anode with the interior of said container.

8. Apparatus for recovering metal from a metal-ion-containing liquid comprising an upright substantially cylindrical non-conductive container for receiving such liquid, electrode means including an anode and cathode disposed within said container for applying an electrical potential to said liquid, said anode formed of a tubular member disposed substantially coaxially in said container, the tubular wall of said anode having a plurality of openings therethrough, means for introducing said liquid from the exterior of said container to the interior of said tubular anode for passage through said openings therein to the interior of said container, said cathode formed of a substantially cylindrical plate member disposed adjacent the inner surface of said container and coaxially surrounding said anode, an agitator having a plurality of generally radially extending vanes coaxially disposed within said container and rotatably supported for rotation around said anode between said anode and said cathode, a liquid outlet disposed at the outer periphery of said container for discharging said liquid therefrom, and means for rotating said agitator to direct the liquid over the surface of said cathode to said outlet.

9. A processing system for removing silver from an exhausted silver-containing photographic processing solution comprising a reservoir for said exhausted solution, an upright substantially cylindrical non-conductive container for receiving said exhausted solution from said reservoir, electrode means including an anode and a cathode within said container for applying an electric potential to said exhausted solution, said anode formed of a tubular member disposed substantially coaxially in said container, the tubular wall of said anode having a plurality of openings provided therethrough, means for introducing said liquid from the exterior of said container to the interior of said tubular anode for passage through said openings therein to the interior of said container, said cathode formed of a substantially cylindrical plate member disposed adjacent the inner surface of said container and coaxially surrounding said anode, an agitator having a plurality of generally radially extending vanes coaxially disposed within said container and rotatably supported for rotation around said anode between said anode and said cathode, a liquid outlet disposed at the outer periphery of said container for discharging said liquid therefrom, and means for rotating said agitator to draw liquid in through said openings in said tubular anode from said reservoir and direct it over the surface of said cathode and out through said outlet.

10. A method of recovering metal from a metal-ion-containing liquid utilizing an apparatus comprising a container for receiving such liquid, electrode means including an anode and a cathode disposed within said container, said anode being formed of a tubular member disposed substantially coaxially in said container, said cathode being formed of a cylindrical plate member disposed adjacent the inner surface of said container and coaxially surrounding said anode, a liquid outlet disposed at the outer periphery of said container, the method comprising the steps of dispensing the metal-ion-containing liquid into the container through a plurality of openings in the anode, agitating the liquid to provide a flow of the liquid outwardly from said anode toward said cathode and through the outlet in the outer periphery of said vessel, and applying an electric current between said anode and said cathode for plating out the metal from the liquid onto the cathode.

11. The invention according to claim 10 wherein the liquid is provided with a substantially uniform velocity over substantially the entire surface of the cathode.

12. A process for electrolytically recovering silver which comprises the steps of supplying an exhausted silver-containing photographic processing solution to an electrolysis vessel by dispensing the solution into the vessel through a series of openings disposed in an axially positioned hollow anode, agitating the dispensed solution, and applying an electrolytic current to a cathode and the anode positioned in the vessel for plating out the silver from the solution on the cathode.

References Cited

UNITED STATES PATENTS

| | | | |
|---|---|---|---|
| 3,282,823 | 11/1966 | Richards | 204—272 |
| 1,682,426 | 8/1928 | Schütte | 204—273 |
| 2,364,564 | 12/1944 | Strickland et al. | 204—272 |
| 1,397,239 | 11/1921 | Slater | 204—275 X |
| 1,937,179 | 11/1933 | Weisberg et al. | 204—130 X |
| 1,954,316 | 4/1934 | Hickman et al. | 204—109 |
| 1,959,531 | 5/1934 | Hickman et al. | 204—273 X |
| 2,180,668 | 11/1939 | Delavenna | 204—272 X |
| 2,415,494 | 2/1947 | Holden | 204—284 X |
| 2,490,730 | 12/1949 | Dubilier | 204—272 X |

FOREIGN PATENTS 1,165,879    3/1964   Germany.

HOWARD S. WILLIAMS, Primary Examiner

H. M. FLOURNOY, Assistant Examiner

U.S. Cl. X.R.

204—105